Figure 1:
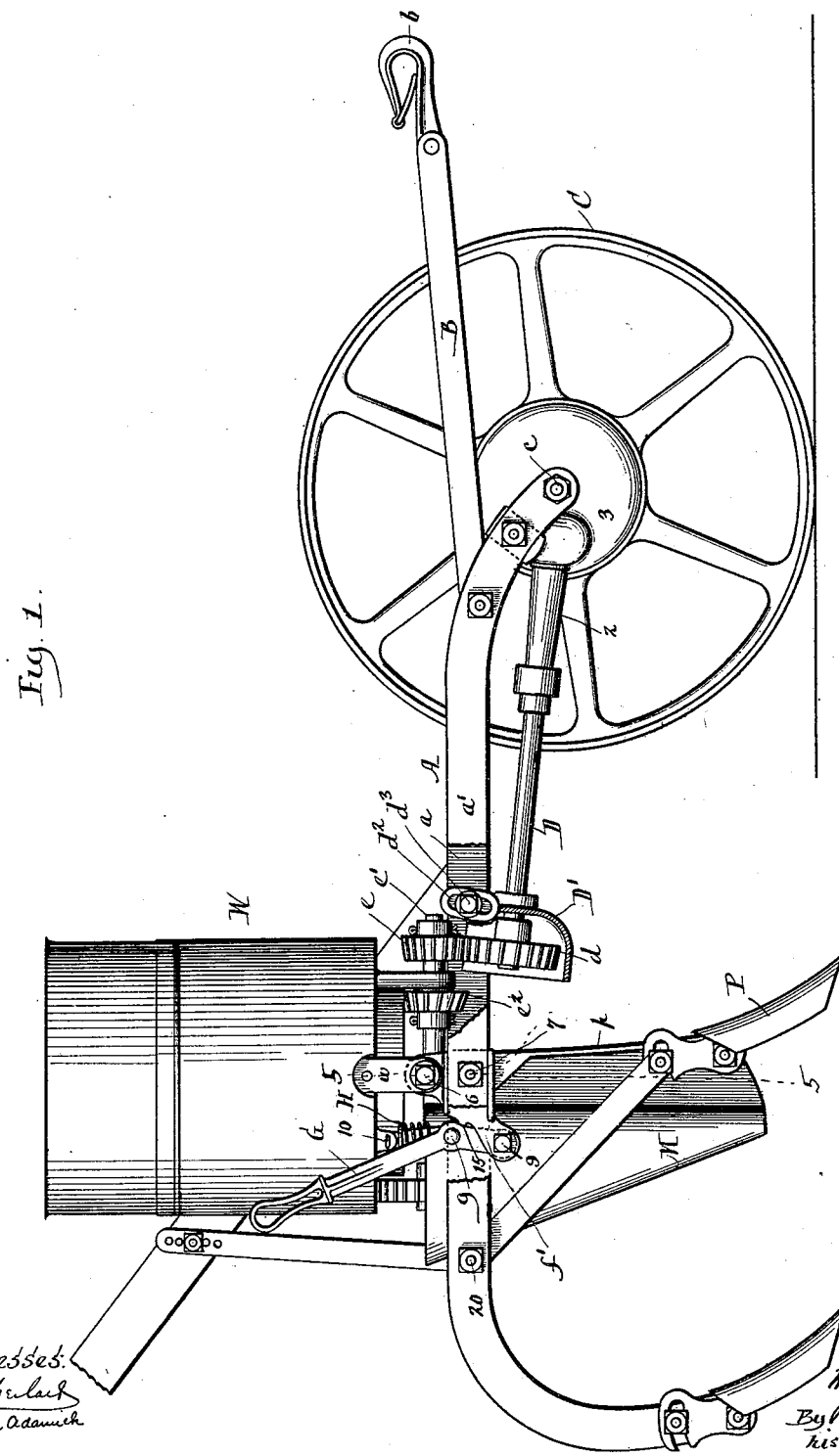

No. 669,126. Patented Mar. 5, 1901.
W. SOBEY.
SEED PLANTER.
(Application filed Oct. 19, 1900.)
(No Model.) 3 Sheets—Sheet 1.

No. 669,126. Patented Mar. 5, 1901.
W. SOBEY.
SEED PLANTER.
(Application filed Oct. 19, 1900.)
(No Model.) 3 Sheets—Sheet 2.
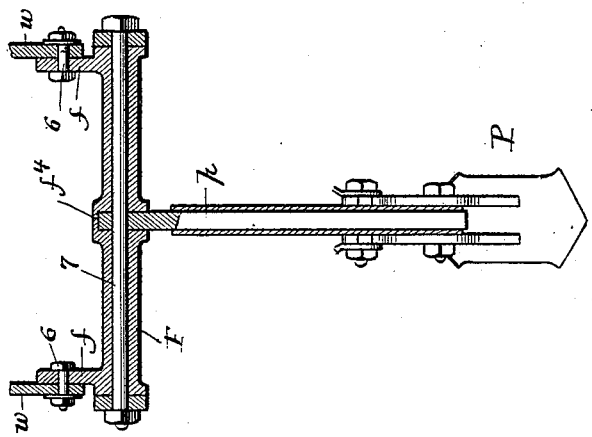
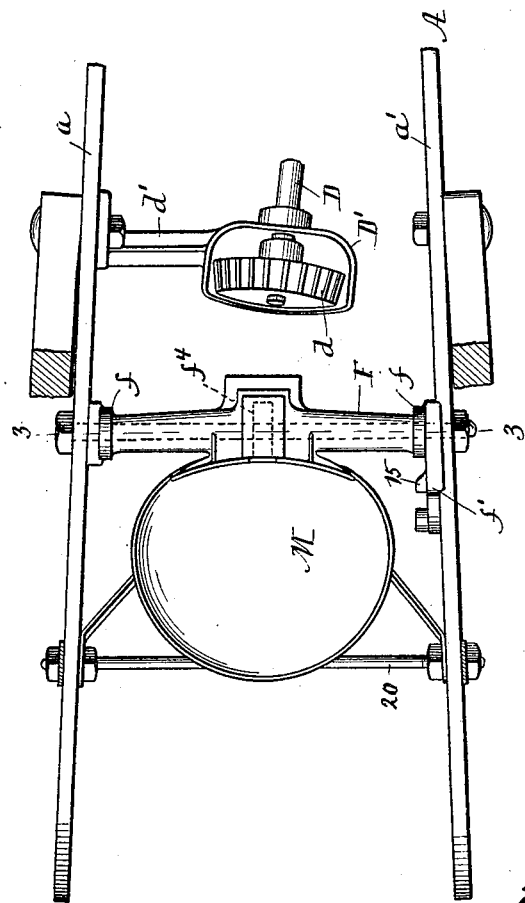
Witnesses:
Inventor:

No. 669,126. Patented Mar. 5, 1901.
W. SOBEY.
SEED PLANTER.
(Application filed Oct. 19, 1900.)
(No Model.) 3 Sheets—Sheet 3.
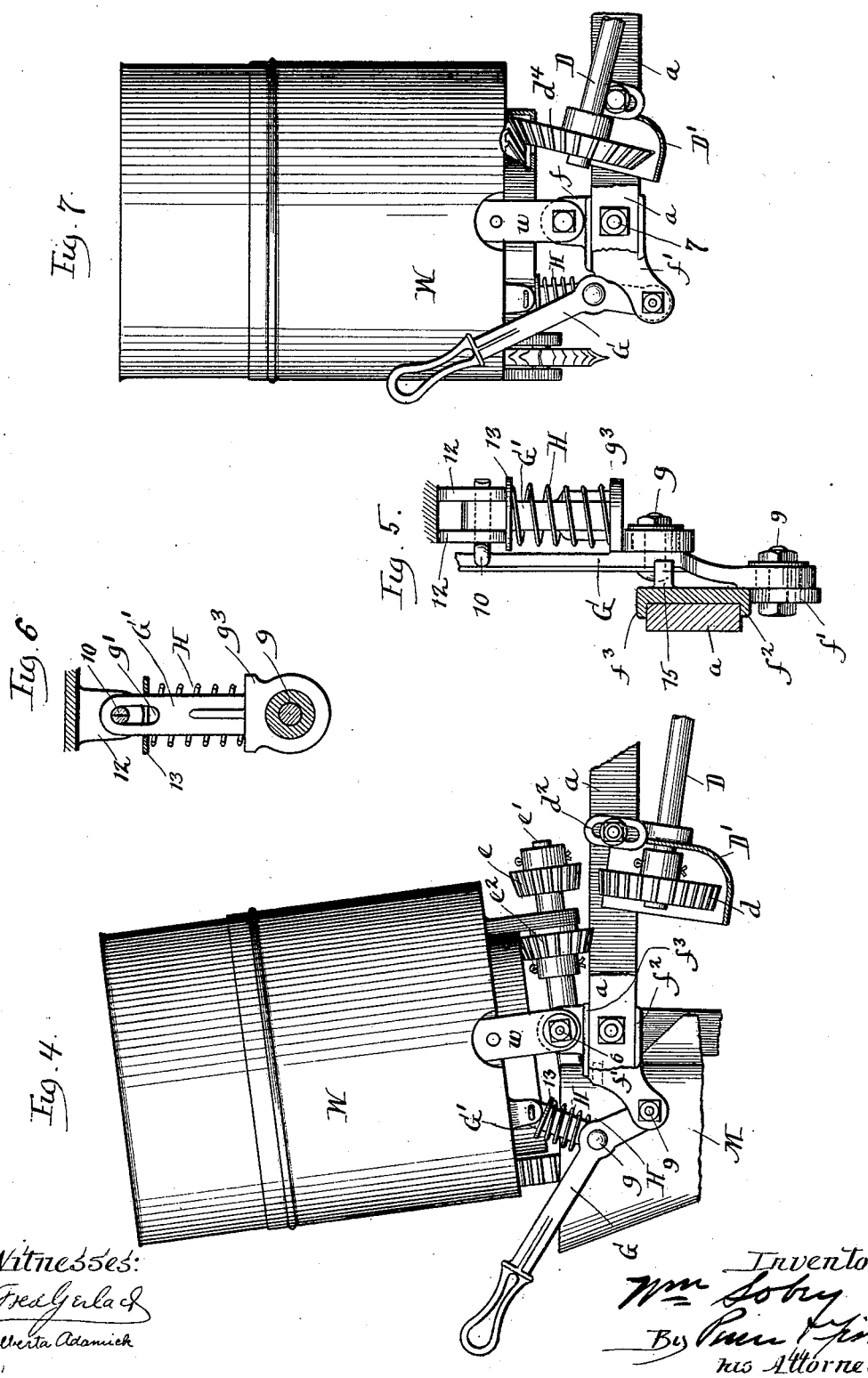

UNITED STATES PATENT OFFICE.

WILLIAM SOBEY, OF RACINE, WISCONSIN, ASSIGNOR TO THE J. I. CASE PLOW WORKS, OF SAME PLACE.

SEED-PLANTER.

SPECIFICATION forming part of Letters Patent No. 669,126, dated March 5, 1901.

Application filed October 19, 1900. Serial No. 33,582. (No model.)

*To all whom it may concern:*

Be it known that I, WILLIAM SOBEY, a resident of the city and county of Racine, in the State of Wisconsin, have invented certain new and useful Improvements in Seed-Planters, of which the following is a full, clear, and exact description.

The present invention, while susceptible of wider application, has relation more especially to that class of planters commonly known as "combined cotton-seed and corn planters," in which the seed to be planted is carried by a hopper mounted upon the main frame and having its feed mechanism actuated from the drive-wheel, suitable means being provided whereby the feed mechanism is thrown into and out of action when desired.

The invention has for its main object to provide improved means for throwing the feed mechanism into and out of action, and has for a further object to provide certain minor features of improvement, all of which will be hereinafter described, illustrated in the accompanying drawings, and particularly pointed out in the claims at the end of this specification.

Figure 1 is a view in side elevation of a combined cotton-seed and corn planter embodying this invention, parts being broken away for better illustration. Fig. 2 is a plan view, parts being in section, of the main frame and certain of the parts connected therewith, the hopper and seed-feeding mechanism being removed. Fig. 3 is a view in vertical section on line 3 3 of Fig. 2. Fig. 4 is a view in side elevation of the hopper and mechanism beneath the same, parts being shown in section and the seed-feeding mechanism being shown out of operative position. Fig. 5 is a detail view, in vertical section, on line 5 5 of Fig. 1. Fig. 6 is a detail view of the toggle-link connecting the operating-lever to the bottom of the feed-hopper. Fig. 7 is a view in side elevation, parts being broken away, of the hopper and adjacent parts, modified gearing being interposed between the main feed-shaft and the seed-feeding mechanism.

The main frame A of the machine will be of usual or suitable construction, the frame shown comprising side bars $a\ a'$, to the front ends of which are bolted the draw-irons B, having their forward ends connected to the usual hitch $b$. Upon an axle $c$, extending between the front ends of the side bars of the main frame, is journaled the usual drive-wheel C, and to this drive-wheel is connected gearing, whereby is driven the main feed or operating shaft D, the inner end of this feed-shaft carrying a suitable gear-wheel $d$ and being journaled in a bracket $D'$. The forward end of the main feed-shaft D extends through a dust-protector or housing 2, that projects rearwardly from the front gear-casing 3, wherein the gear-wheels at the forward end of the main feed-shaft are inclosed. The bracket $D'$ has an arm $d'$ extending outwardly to one of the side bars of the main frame and formed with a slot $d^2$, through which passes the retaining-bolt $d^3$, this bolt-and-slot connection enabling the bracket to be adjustably held at different elevations. Inasmuch as the rear end of the feed-shaft D and the forward end of the counter-shaft $e'$ project beyond their respective bearings, it is manifest that the gear-wheel $d$ and pinion $e$ may be readily removed when it is desired to substitute gear wheels and pinions of other sizes in order to vary the speed of the feeding mechanism within the hopper. The purpose in adjustably sustaining the rear end of the main feed-shaft D is not only to enable gears of different diameters to be thus employed on the free ends of the main feed-shaft D and the counter-shaft $e'$, but also to permit the shaft to be raised or lowered, so as to compensate for any wear of parts or any slight variations or inaccuracies in construction. The hopper W may be of the usual or suitable construction, and the interior of the hopper will be provided with suitable agitator or feed mechanism whereby the seed will be delivered therefrom. Upon the counter-shaft $e'$ is mounted a bevel-pinion $e^2$, that will engage with a corresponding bevel-wheel located within the hopper and serving to operate the feed mechanism therein. From the bottom of the hopper W, at the sides thereof, depend the arms $w$, the lower ends of which are pivotally connected by bolts 6 to the upwardly-extending lugs $f$ of the transverse support F. Preferably the support F is a casting such as shown in Fig. 2 of the drawings, this casting being connected to the main frame by a through-bolt 7, having threaded ends that are engaged by retaining-nuts bearing upon the side bars of the main frame. One end of the support F is shown as provided with a plate $f'$, preferably formed in one piece therewith and having lugs $f^2$ and $f^3$, between which the adjacent side bar $a'$ of the main frame will extend, and the depending rear end of the plate $f'$ is formed with a hole to receive a bolt 9, to which is pivoted the short arm of a lever G, whereby the seed-feeding mechanism will be thrown into and out of operation in a manner to be presently described.

To the lever G is pivotally united, as at $g$, the lower end of a thrust-bolt or toggle-link G', the upper end of which is slotted, as at $g'$, to receive a pin or bolt 10, that passes also through the depending ears 12 on the bottom of the hopper W, and thus pivotally unites the upper end of the link or bolt G' to the bottom of the hopper. Upon the link or bolt G' is mounted a coil-spring H, the lower end of which bears upon a shoulder or offset $g^3$ of the link or bolt, while its upper end bears against a washer 13, that encircles the upper portion of the link or bolt G'. The purpose of the lever G is to enable the seed-feeding mechanism to be readily thrown into and out of operation, and it will be understood that when the lever G is moved from the position seen in Fig. 4 to the position shown in Fig. 1 of the drawings the hopper W will be moved to the position there seen, so that the gear-pinion $e$ beneath the front of the hopper will engage with the gear-wheel $d$ on the rear end of the main feed-shaft D. So, also, it is apparent that if the lever G be turned rearwardly and downwardly about its pivot-point 9, as shown in Fig. 4 of the drawings, the thrust-bolt or link G' will draw downwardly the rear end of the hopper W, causing the hopper to rock about the pivot-point 6, and thereby lift the forward end of the counter-shaft $e'$ until the pinion $e$ is disengaged from the gear-wheel $d$.

It will be seen that when the operating-lever G is in the locked position (shown in Fig. 1) the forward edge of this lever will bear against a stop 15, that is preferably cast upon the inner face of the plate $f'$ of the support F. The downward and rearward movement of the lever G may be limited either by the contact of the lever with a stay-bolt 20, that extends between the side bars of the main frame, or by the contact of the bottom of the hopper with the upper end of the seed-spout M. If the points of the teeth of the pinion $e$ and gear-wheel $d$ should contact or "ride" when the operating-lever G is turned forwardly to bring the seed mechanism into action, the slot of the thrust-bolt or link G' will still allow the complete forward movement of the lever G until the pivot-point $g$ of the lever is brought across the dead-center, as shown in Fig. 1, thereby insuring the retention of the lever in locked position and insuring also the accurate intermeshing of the pinion $e$ and gear-wheel $d$ as soon as the points of their teeth cease to ride. By employing the toggle-lever mechanism above described not only is the shifting of the seed-feeding mechanism into and out of action readily accomplished, but the operating-lever is held in locked or unlocked position, according as the pivot-point $g$ is in front or at the rear of the dead-center or line of connection between the pivot-point of the upper end of the thrust-bolt or link G' and the pivot-point of the lower end of the lever G.

By reference to Fig. 3 it will be observed that the center of the support F is formed with a recess or socket $f^4$, into which sits the upper end of the shank $p$ of the furrow-shovel P, the shank $p$ being held in position by the bolt 7, that passes through the support F. In this way a very effective means is provided for securing the upper end of the furrow-shovel shank.

While I have described what I regard as the preferred embodiment of my invention, it is manifest that the details may be varied by the skilled mechanic without departure from the invention. Thus, for example, in Fig. 7 of the drawings is shown a modification in which the counter-shaft at the bottom of the hopper is dispensed with and in which a beveled gear-wheel $d^4$ on the rear end of the main feed-shaft D engages directly with a corresponding beveled gear-wheel in the bottom of the hopper. In this construction, as in that hereinbefore described, however, the shifting of the operating-lever G serves to throw the seed-feeding mechanism out of action by its disengagement with the beveled gear-wheel $d^4$.

So far as I am aware this invention presents the first instance of the employment of a pivoted lever for throwing the seed-feeding mechanism into and out of operation, a lost-motion connection and spring being employed whereby an excess movement of the lever is permitted and whereby the engagement of the seed-feeding mechanism with the driving-gear is insured. Manifestly, therefore, the details of the lever mechanism may be varied without departure from the spirit of the invention.

Having thus described my invention, what I claim as new, and desire to secure by Letters Patent, is—

1. In a seed-planter, the combination with a main frame having a drive-wheel, seed-feeding mechanism and suitable gearing between said drive-wheel and said feeding mechanism, of a pivoted lever for throwing said feed mechanism into and out of operation, and a lost-motion connection and spring for said lever, whereby an excess movement of the lever is permitted to insure the engagement of the feed mechanism with the gearing connected to the drive-wheel.

2. In a seed-planter, the combination with the main frame, its drive-wheel, a tilting seed-hopper, and seed-feeding mechanism connected to said hopper, of an operating-lever pivoted to the main frame, a pivoted link interposed between said lever and the seed-hopper, said link having a loose connection with one of said parts, and a spring interposed between said lever and said hopper.

3. In a seed-planter, the combination with the main frame, its drive-wheel, the tilting seed-hopper, a seed-feeding mechanism connected to said hopper, of a pivoted operating-lever for throwing the feed mechanism into and out of action, a slotted link interposed between said lever and the seed-hopper and pivotally connecting said parts, and a compression-spring interposed between said hopper and said lever.

4. In a seed-planter, the combination with a main frame having a drive-shaft, seed-feeding devices and suitable gearing between said drive-shaft and said feeding devices, of toggle mechanism interposed between said frame and said feeding devices for throwing the latter into and out of operation, and a stop for engaging said toggle mechanism, the latter arranged to be moved slightly past its dead-center into engagement with said stop to lock in operative position the gearing between said drive-shaft and said feeding devices.

5. In a seed-planter, the combination with a main frame having a drive-shaft, seed-feeding devices and suitable gearing between said drive-shaft and said feeding devices, of toggle mechanism interposed between said frame and said feeding devices and movable on either side of its dead-center for throwing the latter into and out of operation, and a spring acting to hold said toggle mechanism on either side of its dead-center.

6. In a seed-planter, the combination with the main frame having a driving-shaft, of seed-feeding devices mounted upon a part pivotally connected to said frame, said feeding devices and said drive-shaft provided with gears arranged to intermesh, a hand-lever pivoted at its end to said frame and a link pivoted to said lever intermediate its ends and to said parts, whereby the feeding devices are thrown into and out of operation.

7. In a seed-planter, the combination with a main frame having a drive-wheel, seed-feeding mechanism and suitable gearing between said drive-wheel and said feeding mechanism, of toggle-lever mechanism interposed between said main frame and the movable part of the feeding mechanism, and an interposed spring for moving said toggle-lever mechanism toward its locked position.

8. In a seed-planter, the combination with the main frame, its drive-wheel, a tilting feed-hopper and seed-feeding mechanism connected with said hopper, of toggle-lever mechanism interposed between the main frame and said feeding mechanism and whereby the hopper and the parts carried thereby may be tilted, said toggle-lever mechanism having its dead-center arranged between the extremes of movement necessary to hold the feed mechanism in and out of operation, and a spring acting upon said toggle-lever mechanism.

9. In a seed-planter, the combination with the main frame, and its drive-wheel and with a tilting hopper having feed mechanism and a gear connected therewith, of a drive-shaft having a vertically-adjustable free rear end provided with a gear-wheel beneath the gear-wheel of the hopper.

10. In a seed-planter, the combination with the main frame, its drive-wheel and a tilting hopper, of a main feed-shaft having a free rear end provided with a gear-wheel, a tilting counter-shaft connected to the bottom of the hopper and having a free front end provided with a gear-wheel arranged above the gear-wheel at the rear end of the main feed-shaft, whereby the interchanging of the gear-wheels may be readily effected.

WILLIAM SOBEY.

Witnesses:
HALSTEN JOSEPH THORKELSON,
FRANCIS LOVELL ALLEN.